United States Patent
Bette et al.

(10) Patent No.: US 7,935,446 B2
(45) Date of Patent: May 3, 2011

(54) METHOD FOR OPERATING A FUEL CELL SYSTEM AND FUEL CELL SYSTEM

(75) Inventors: Willi Bette, Erlangen (DE); Detlev Coerlin, Erlangen (DE); Walter Stühler, Hirschaid (DE); Ottmar Voitlein, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 959 days.

(21) Appl. No.: 10/590,556

(22) PCT Filed: Feb. 14, 2005

(86) PCT No.: PCT/EP2005/050623
§ 371 (c)(1),
(2), (4) Date: Jul. 16, 2007

(87) PCT Pub. No.: WO2005/081341
PCT Pub. Date: Sep. 1, 2005

(65) Prior Publication Data
US 2007/0281188 A1 Dec. 6, 2007

(30) Foreign Application Priority Data

Feb. 25, 2004 (EP) .................................. 04004216

(51) Int. Cl.
*H01M 8/06* (2006.01)
*H01M 8/00* (2006.01)
*H01M 8/04* (2006.01)
(52) U.S. Cl. ......... 429/410; 429/400; 429/408; 429/430
(58) Field of Classification Search .................... 429/17, 429/12, 13, 410, 400, 408, 430
See application file for complete search history.

(56) References Cited

U.S. PATENT DOCUMENTS

| | | | | |
|---|---|---|---|---|
| 3,785,870 A | * | 1/1974 | Winsel | ............................ 429/17 |
| 5,797,980 A | | 8/1998 | Fillet | |

FOREIGN PATENT DOCUMENTS

| | | |
|---|---|---|
| DE | 199 03 353 A1 | 8/2000 |
| DE | 102 18 673 A1 | 11/2003 |
| EP | 0 850 494 B1 | 7/1998 |
| EP | 0 925 614 B1 | 6/1999 |
| JP | 09231990 A | 9/1997 |

* cited by examiner

*Primary Examiner* — Patrick Ryan
*Assistant Examiner* — Julian Mercado

(57) ABSTRACT

During the operation of a fuel-cell assembly, the latter is supplied with ambient air with the aid of a liquid ring pump. Any foreign matter that is contained in the air is taken up by the service fluid of the liquid ring pump. The charging of the service fluid with foreign matter is controlled. In particular, the service fluid is continuously conducted in an circuit via a purification device.

15 Claims, 2 Drawing Sheets

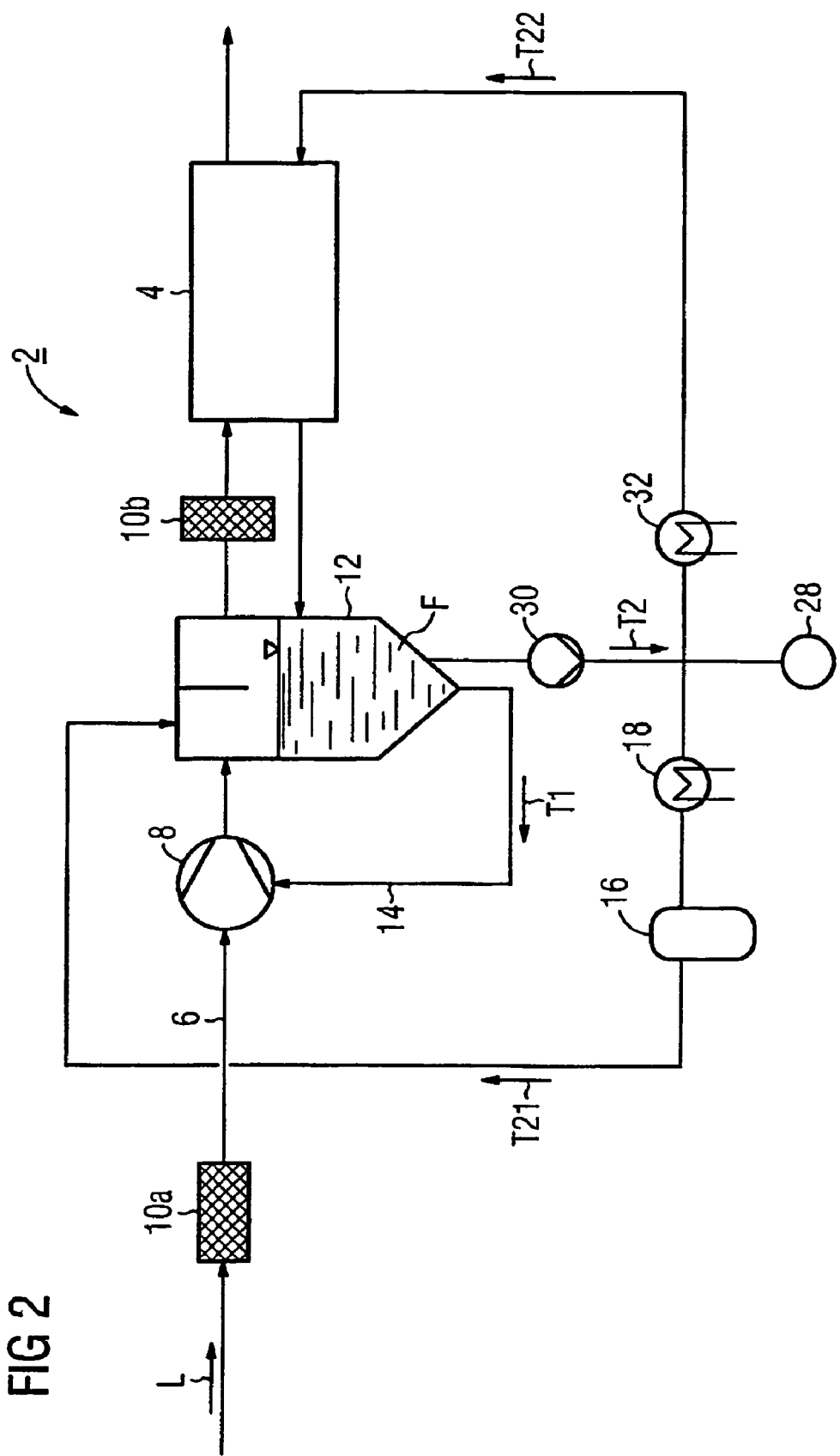

US 7,935,446 B2

METHOD FOR OPERATING A FUEL CELL SYSTEM AND FUEL CELL SYSTEM

CROSS REFERENCE TO RELATED APPLICATIONS

This application is the US National Stage of International Application No. PCT/EP2005/050623, filed Feb. 14, 2005 and claims the benefit thereof. The International Application claims the benefits of European Patent application No. 04004216.0 filed Feb. 25, 2004. All of the applications are incorporated by reference herein in their entirety.

FIELD OF THE INVENTION

The invention relates to a method for operating a fuel cell system as well as to a fuel cell system, wherein a process gas is supplied to the fuel cell system with the aid of a liquid ring pump.

BACKGROUND OF THE INVENTION

During the operation of a fuel cell system, for generating electric current a fuel cell block formed by stacked fuel cells is conventionally supplied at the anode side with a fuel gas, for example hydrogen, and at the cathode side with air or oxygen. Meanwhile, a large number of different types of fuel cell system exist, which differ in terms of their design, in particular in terms of the electrolyte used, as well as in terms of the required operating temperature.

If ambient air is used as a process gas, it is conventionally supplied via filters in order to rid it of for example dust-containing impurities before it enters the fuel cell block. This is necessary particularly when the fuel cell system is used in an environment where extreme contamination of the air is to be expected. Especially in the case of mobile use of a fuel cell system, for example in the field of shipping for boats or submarines, purification of the process gas is essential in order to guarantee the operating capability of the fuel cell block, particularly given the use of so-called PEM fuel cells.

For supplying the process gases, the use of a liquid ring pump is inferable for example from EP 0 925 614 B1 or EP 0 850 494 B1. The liquid ring pump offers the advantage that, because of the working principle of the liquid ring pump, with compression there is automatically simultaneously a humidification of the process gas.

SUMMARY OF THE INVENTION

The object of the invention is to enable improved operation of a fuel cell system.

The object is achieved according to the invention by a method for operating a fuel cell system, whereby a process gas, in particular ambient air, is supplied to the fuel cell system with the aid of a liquid ring pump, wherein impurities contained in the process gas are taken up by the operating liquid of the liquid ring pump and the contamination of the operating liquid with the impurities is monitored.

According to this method, therefore, the liquid ring pump is advantageously used also for purification purposes. The liquid ring pump therefore simultaneously performs a plurality of functions, namely compression, humidification and purification of the process gas. Here, in order to maintain the purification function throughout the service life, it is further provided that the contamination of the operating liquid with the impurities is monitored. Monitoring in the present case means not only active monitoring, whereby by purification measures the degree of contamination of the operating liquid is kept below a limit value so that purification of the air continues to remain possible by means of the liquid ring pump. Monitoring also means passive monitoring, whereby the degree of contamination of the operating liquid is monitored, i.e. measured, in order to ascertain whether there is still an adequate purifying effect.

The invention in this case utilizes the working principle of a liquid ring pump, in which during compression of the gas a mixing of the gas with the operating liquid of the liquid ring pump occurs. By virtue of the intimate mixing with the operating liquid, impurities are separated in the operating liquid. Impurities are, for example, accumulated particles or salts clinging to aerosols and dust particles, such as occur above all in an intake of sea air. These impurities are therefore prevented from passing into the gas compartments of the fuel cells and adversely affecting their operation and reliability. The impurities that are washed out of the air in this case accumulate in the operating liquid.

According to an advantageous development, it is provided that the contamination of the operating liquid is measured. In particular, in this case the conductivity of the operating liquid is measured in order to obtain an indication of ionic impurities.

In order to prevent damage to the fuel cell block, when an upper limit value of the contamination of the operating liquid is exceeded, operation of the fuel cell block is interrupted in particular automatically. For the purpose of interruption, in this case the fuel cell system is either completely shut down or transferred to a "no-load" operating position, in which process gas is no longer supplied to the fuel cell block, but circulation of the operating liquid is maintained. As soon as suitable measures have reduced the contamination of the operating liquid back to a low value, normal operation is resumed.

In order to keep the contamination of the operating liquid low and/or reduce it, in a preferred development it is provided that, when a lower limit value of the contamination is exceeded, the operating liquid is exchanged or purified in a purifying device. This measure to reduce the contamination of the operating liquid is therefore carried out only from time to time, i.e. intermittently. In this case, the upper and the lower limit value may be identical so that, when this limit value is reached, on the one hand operation of the fuel cell block is automatically interrupted and, parallel thereto, the measure to reduce the contamination of the operating liquid is initiated.

In a preferred refinement, a continuous purification of the operating liquid is provided. For this purpose, preferably at least one component flow of the operating liquid is conveyed in a circuit, in which a purifying device is disposed. By virtue of this measure, the contamination of the operating liquid is kept permanently at a sufficiently low value for an interruption of the operation of the fuel cell block to be unnecessary. In this case, the purifying device advantageously comprises an ion exchanger, with the aid of which the ionic impurities are removed or at least reduced.

To improve the operating capability, in particular the efficiency of the purifying device, in an advantageous development it is provided that the operating liquid is supplied via a heat exchanger to the purifying device. The heat exchanger therefore effects a tempering, in particular a cooling, of the operating liquid in order to guarantee the operating capability of the ion exchanger.

The operating capability of the purifying device, i.e. its ability to reduce the impurities in the operating liquid, is advantageously monitored. This is effected either directly, for example by measurement of a parameter of the purifying device in order directly to determine the enrichment of the purifying device with impurities. Alternatively, monitoring is effected indirectly by measurement of the operating liquid contamination.

When the contamination in particular of the operating liquid passing out of the purifying device exceeds a specific limit value, this is judged to be an indication that the purifying device is no longer capable of operating. In the situation where only an inadequate purifying efficiency of the purifying device is established, this purifying device is preferably regenerated and during the regeneration phase there is a switchover to a further purifying device or operation of the fuel cell block is interrupted. In the case of switchover to a further purifying device, uninterrupted operation is possible.

To keep the construction compact and therefore keep the cost of a fuel cell system as low as possible, it is preferably further provided that the operating liquid of the liquid ring pump is used simultaneously as cooling water for the fuel cell system.

According to the invention, the object is further achieved by a fuel cell system, in which a liquid ring pump inserted into a feed line for a process gas is provided for compressing the process gas intake and in addition a device for monitoring the contamination of the operating liquid is provided.

The advantages and preferred developments outlined in respect of the method are analogously applicable also to the fuel cell system.

BRIEF DESCRIPTION OF THE DRAWINGS

An exemplary embodiment of the invention is described in detail below with reference to the drawings. The drawings show in each case in diagrammatic and highly simplified block diagrams:

FIG. 2 the principle of a fuel cell system according to a second variant, in which the operating liquid of the liquid ring pump is used simultaneously as cooling liquid for the fuel cell block.

DETAILED DESCRIPTION OF THE INVENTION

Figure 1:
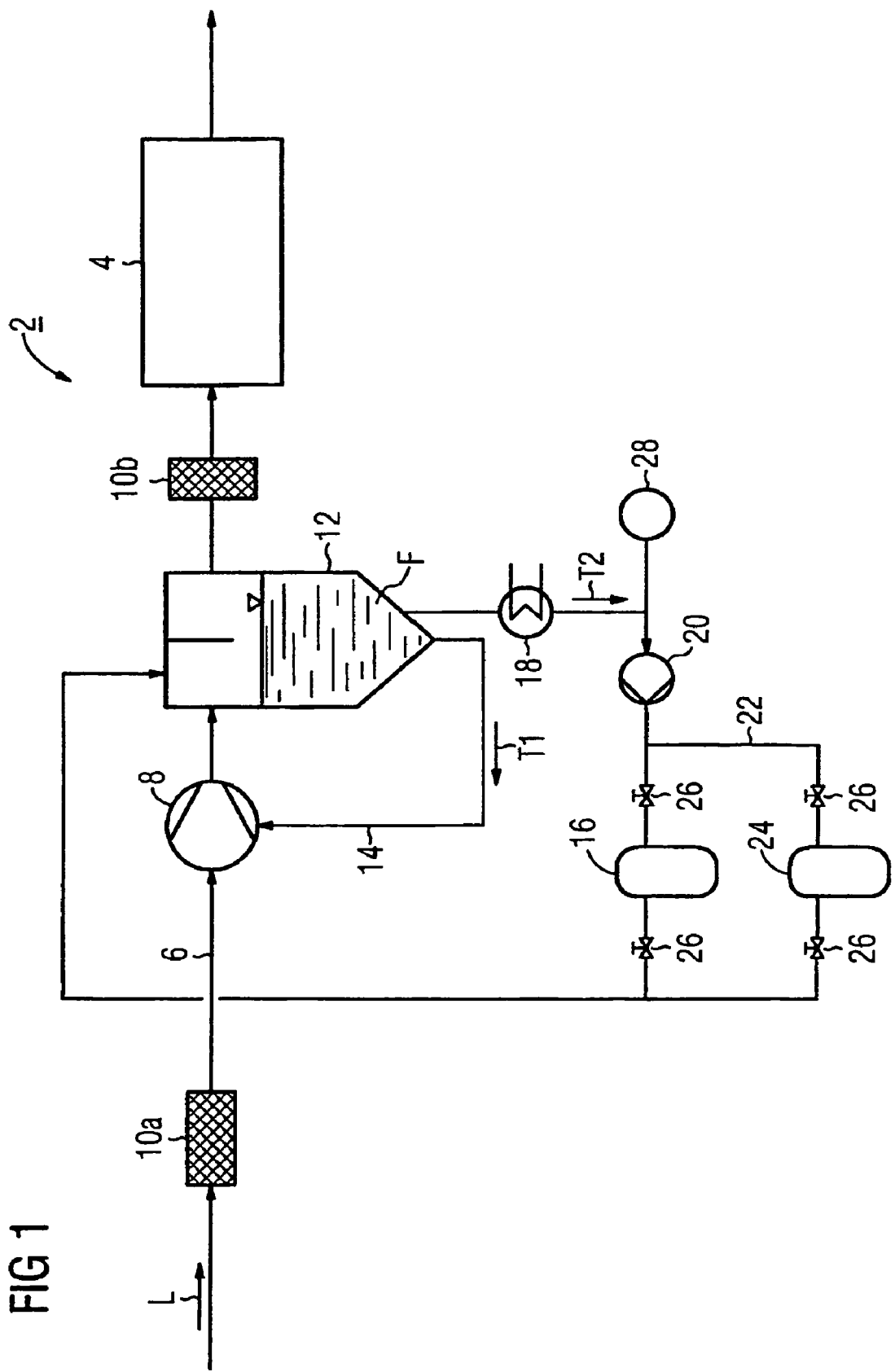
FIG. 1 the principle of a fuel cell system in a first variant.

A fuel cell system 2 according to FIGS. 1 and 2 comprises a fuel cell block 4, which comprises a plurality of individual stacked fuel cells. In particular, for this purpose PEM fuel cells are used. A process gas, in this case ambient air L, is supplied through a feed line 6 to the fuel cell block 4. A fuel gas, for example hydrogen, is moreover supplied to the fuel cell block 4 in a manner not represented here.

Disposed in the feed line 6 is a liquid ring pump 8, which is also known as a water ring compressor. During operation, the air L is taken in through a first filter 10a, compressed in the liquid ring pump 8 and fed via a water separator 12 and a second filter 10b to the fuel cell block 4. From the water separator 12 an operating liquid F of the liquid ring pump 8 is fed through a return line 14 back to the liquid ring pump 8. A first component flow T1 of the operating liquid F is therefore conveyed in a small circuit between the liquid ring pump 8 and the water separator 12. A second component flow T2 of the operating liquid F is fed via a purifying device 16 back to the water separator 12. The component flow T2 is therefore likewise conveyed in a circuit between the water separator 12 and the purifying device 16.

According to the variant of FIG. 1, disposed between the water separator 12 and the purifying device 16 there is first a heat exchanger 18 and then a circulation pump 20. In addition to the purifying device 16, there is a further purifying device 24 disposed in a parallel-running line branch 22. The two purifying devices 16, 24 may be connected to or disconnected from the system in each case by means of valves 26.

A measuring device 28 is further provided, which measures and monitors the conductivity of the operating liquid F supplied to the purifying device 16.

Unlike the embodiment according to FIG. 1, in the variant of FIG. 2 it is provided that the component flow T2 is used simultaneously as cooling liquid for the fuel cell block 4. In this case, in flow direction of the operating liquid F downstream of the water separator 12 there is provided first a common cooling water pump 30 of adequately large dimensions. Downstream of this pump, the component flow T2 is split into two partial component flows T21 and T22. The use of a common coolant pump 30 has the advantage that only one pump is required for circulating the operating liquid in the partial component flows T21 and T22.

In the partial component flow T22 the liquid is conveyed in a circuit between the water separator 12 and the fuel cell block 4. In the partial component flow T21 the heat exchanger 18 and the purifying device 16 are disposed in flow direction one downstream of the other. Here too,—as represented in FIG. 1—a further purifying device 24 may be connected in parallel to the first purifying device 16. In the second partial component flow T22 yet another heat exchanger 22 is disposed upstream of the fuel cell block 4. The heat exchangers 18, 32 are loaded in each case with cooling water for cooling the operating liquid F.

During operation of the fuel cell system 2, air L is taken in by means of the liquid ring pump 8 and undergoes preliminary purification for example from dust particles by means of the first air filter 10a. In the liquid ring pump 8 the intake air L, because of the working principle of the liquid ring pump 8, is intimately mixed with the operating liquid F of said pump. The impurities contained in the air L are therefore removed and accumulate in the operating liquid F. Such impurities are for example fine dust particles not retained by the first air filter 10a or soluble constituents of the air. The compressed air leaves the liquid ring compressor 8 together with some of the operating liquid F and is fed to the water separator 12, in which the washed air is separated in an aerosol-free manner from the operating liquid F. The operating liquid F collects in the bottom region, while the purified air L passes out of the water separator 12 and is fed to the fuel cell block 4. The second air filter 10b disposed between the liquid ring pump 8 and the water separator 12 retains any particles that have been swirled up in the water separator 12.

As the operating liquid F in the circulating circuit is returned to the liquid ring pump 8, the impurities rapidly accumulate. Over time, therefore, the contamination of the operating liquid F would increase in such a way that a purifying effect would no longer be achieved. For this reason, monitoring and in particular also purification of the operating liquid F is provided. Firstly, for this purpose the degree of contamination is monitored by the measuring device 28. In the present case, the conductivity of the operating liquid F is measured. Measurement may be effected both upstream and downstream of the purifying device 16. The measurement and monitoring of the conductivity is effected preferably automatically.

Furthermore, for monitoring the operating liquid F the purifying devices 16, 24 are provided. During operation, the operating liquid F is namely fed through the purifying device 16 in the form of an ion exchanger. In this device, dissolved ions contained in the operating liquid F are bonded to ion exchange resins of the ion exchanger and therefore removed from the operating liquid F. As the service life progresses, the capacity of the ion exchanger is gradually exhausted and its ability to bond ions gradually diminishes. This diminishing purifying effect leads to an increase of the conductivity of the operating liquid F. In a non-illustrated development, the purifying device 16 in addition to the ion exchanger also comprises further components, for example a dust separator or filter for further purification of the operating liquid F.

For maintaining the purifying action of the liquid ring pump 8, different operating modes are possible. According to a first operating mode, when a lower limit value of the conductivity is exceeded, there is a switchover to the further purifying device 24 and the first purifying device 16 is regenerated.

In a second operating mode, the contamination of the operating liquid F is measured in the return line 14 or in the water separator 12 by the measuring device 18, and the component flow T2 and hence the purifying device 16, 24 is connected to the system only, if need be, when the operating liquid F has an increased degree of contamination above the lower limit value (intermittent purification). In a simplified implementation, instead of connection of the purifying device 16, 24 to the system, an exchange or part-exchange of the operating liquid F for uncontaminated fresh water may be effected.

According to a third operating mode, it is further provided that, when an upper limit value of the impurities in the operating liquid F is exceeded, there is an, in particular automatic shutdown of the operation of the fuel cell block 4. For this purpose for example a monitoring device, which is not represented in detail, is provided, which reads out and evaluates the measured values determined by the measuring device 28 and, if need be, brings about the automatic shutdown. Alternatively for this purpose, instead of the automatic shutdown, when the upper limit value is exceeded a signal is output so that the shutdown of the fuel cell block 4 may be carried out manually by the operating personnel.

While the fuel cell block 4 is shut down, the fuel cell system 2 is either operated at no load, i.e. without a supply of process gas, or completely shut down. Furthermore, after shutdown a purifying measure is initiated, either the regeneration of the purifying device 16 or the at least partial exchange of the operating liquid F for fresh water.

This third operating mode is advantageously provided as a safety function for all eventualities and in addition to the two previously described operating modes. It is however also possible independently of the other two operating modes. In this case, the operating liquid F is monitored only for one limit value, namely the upper limit value of the contamination and operation of the fuel cell system is regularly interrupted when the contamination of the operating liquid exceeds the limit value.

The invention claimed is:

1. A method for operating a fuel cell system, comprising:
   supplying a process gas to the fuel cell system via a liquid ring pump, wherein impurities contained in the process as are removed by an operating liquid of the liquid ring pump;
   monitoring a contamination with the impurities of the operating liquid, wherein the contamination of the operating liquid is monitored by measuring the conductivity of the operating liquid;
   interrupting an operation of a fuel cell block of the fuel cell system when a contamination upper limit of the of the operating liquid is exceeded;
   exchanging the operating liquid or purifying the operating liquid via a purifying device when a contamination lower limit value of the operating liquid is exceeded,
   wherein a component flow of the operating liquid is transmitted via the purifying device, and
   wherein the purifying device includes an ion exchanger.

2. The method as claimed in claim 1, wherein the operating liquid is cooled via a heat exchanger prior to transmission to the purifying device.

3. The method as claimed in claim 2, wherein an operating capability of the purifying device is monitored.

4. The method as claimed in claim 3, further comprising:
   regenerating the purifying device and performing a switchover to a second purifying device or interrupting the operation of the fuel cell block of the fuel cell system when an inadequate purifying efficiency threshold of the purifying device is reached.

5. The method as claimed in claim 4, wherein the operating liquid simultaneously functions as cooling water for the fuel cell system.

6. A fuel cell system, comprising:
   a feed line that transmits a process gas;
   a liquid ring pump connected to the feed line that compresses the process gas;
   an operating liquid that purifies the process gas from impurities;
   a monitoring device that monitors a contamination with the impurities of the operating liquid, and
   a purifying device comprising an ion exchanger for reducing the impurities of the operating liquid,
   wherein a signal is output when an upper limit value of the impurities in the operating liquid is exceeded.

7. A method for operating a fuel cell system, comprising:
   passing an intake air through a first filter, wherein the filtered intake air contains a residual contaminant;
   mixing the intake air with an operating liquid;
   compressing the mixed intake air and operating liquid in a liquid ring pump;
   transferring the residual contaminant contained in the compressed intake air to the operating liquid;
   separating the operating liquid containing the residual contaminant from the compressed intake air via a liquid separator;
   transmitting the purified and compressed intake air to a fuel cell block of the fuel cell system; and
   monitoring a contamination level of the operating liquid.

8. The method as claimed in claim 7, wherein the compressed intake air contains a plurality of residual contaminants.

9. The method as claimed in claim 8, wherein the contamination of the operating liquid is monitored by measuring the conductivity of the operating liquid.

10. The method as claimed in claim 9, further comprising:
    interrupting the operation of a fuel cell block of the fuel cell system when a contamination upper limit of the operating liquid is exceeded.

11. The method as claimed in claim 10, wherein the operating liquid is exchanged or purified via a purifying device when an operating liquid contamination lower limit value is exceeded.

12. The method as claimed in claim 11, wherein the purifying device includes an ion exchanger.

13. The method as claimed in claim 12, wherein the operating liquid is cooled via a heat exchanger prior to transmission to the purifying device.

14. The method as claimed in claim 13, further comprising:
monitoring the efficiency of the purifying device,
switching-over to a second purifying device when an inadequate purifying efficiency threshold of the purifying device is reached, and
regenerating the purifying device.

15. The method as claimed in claim 13, further comprising:
monitoring the efficiency of the purifying device,
interrupting the operation of the fuel cell block of the fuel cell system when an inadequate purifying efficiency threshold of the purifying device is reached, and
regenerating the purifying device.

* * * * *